A. T. THOITS & J. G. GRONBERG.
BOX FASTENER.
APPLICATION FILED JUNE 19, 1908.
899,084.
Patented Sept. 22, 1908.
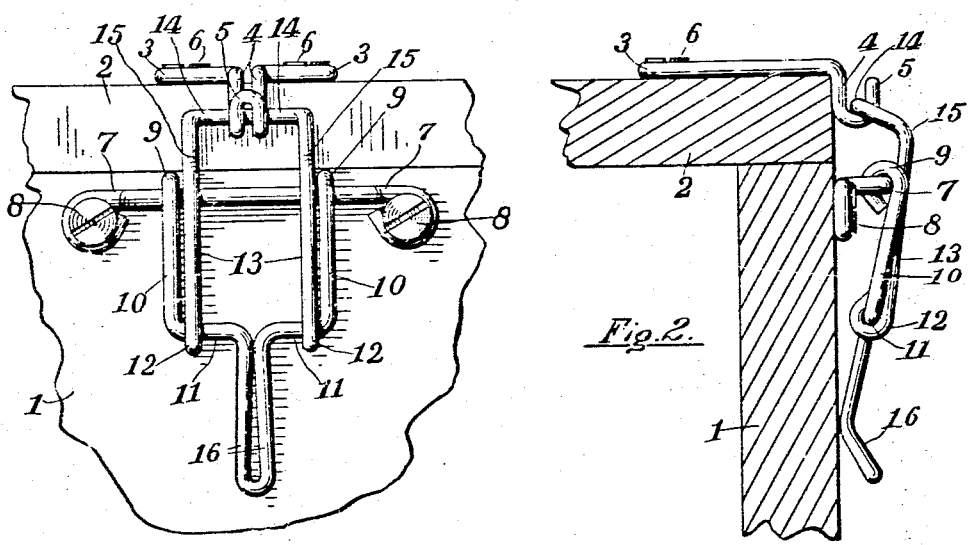
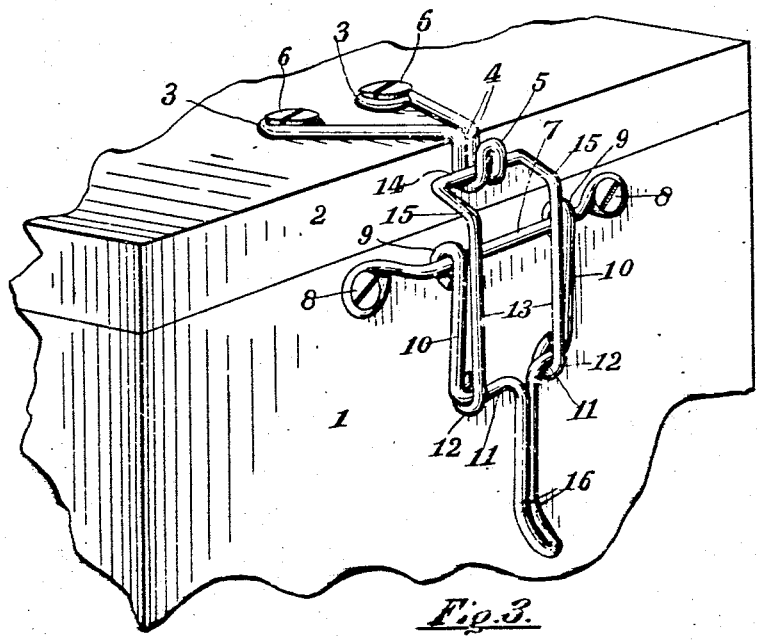

UNITED STATES PATENT OFFICE.

ALVIN T. THOITS AND JOHN G. GRONBERG, OF GRAND RAPIDS, MICHIGAN, ASSIGNORS TO CALORIC FIRELESS COOK STOVE COMPANY, OF GRAND RAPIDS, MICHIGAN, A CORPORATION OF MICHIGAN.

BOX-FASTENER.

No. 899,084.   Specification of Letters Patent.   Patented Sept. 22, 1908.

Application filed June 19, 1908.   Serial No. 439,408.

*To all whom it may concern:*

Be it known that we, ALVIN T. THOITS and JOHN G. GRONBERG, citizens of the United States of America, residing at Grand Rapids, in the county of Kent and State of Michigan, have invented certain new and useful Improvements in Box-Fasteners; and we do hereby declare the following to be a full, clear, and exact description of the invention, such as will enable others skilled in the art to which it appertains to make and use the same.

Our invention relates to improvements in box fasteners, and more particularly to fasteners for use on fireless cookers, and its object is to provide a strong and secure device that will yieldingly clamp the cover in closed position, and to provide the same with various new and useful features hereinafter more fully described and particularly pointed out in the claims, reference being had to the accompanying drawings, in which:

Figure 1. is a front elevation of a device embodying our invention; Fig. 2. a side elevation of the same; and, Fig. 3. a perspective of the same.

Like numbers refer to like parts in all of the figures.

1 represents the side of a box to which the device is applied; 2 the cover of the box. Secured to the cover is a hook formed of a piece of wire folded at the middle and having diverging arms terminating in eyes or loops 3 to receive fastenings 6, preferably screws inserted therein and extending into the cover. The middle portion of this wire is bent downward at right angles as at 4 extending over the corner of the cover and opposite the edge of the same. It is thence turned outward and upward forming a hook 5 to receive the link member. A bar 7 formed of a piece of wire extends horizontally on the side of the box below the hook 5, having its middle portion spaced apart from the box, and its ends provided with loops or eyes to receive fastenings consisting of screws 8 inserted in the side of the box, whereby the bar is securely held in place. Pivoted on this bar by means of eyes or loops 9 formed in the respective ends of the same, is a lever made of wire having its respective ends spaced apart and extending from the bar 7 to a proper distance to form a lever, at about the middle of which the wire is bent inward at right angles having portions 11 in horizontal alinement, the remaining portion of the lever being formed into a handle portion 16 consisting of the middle portion of the wire folded or bent upon itself and extending parallel and close together. Pivoted upon the horizontal portion 11 of this lever member by means of loops or eyes 12 in its respective ends is a U-shaped link having parallel sides 13 extending between the portions 10 of the lever, the upper end of this link being bent rearward as at 15 and having its middle horizontal portion 14 detachably engaged with the hook 5. This rearward bend in the upper part of the link serves to render the link somewhat yielding to operate as a spring to effectually close the cover and permit the lever to spring inward to place. It also permits the pivotal connection of the link and the lever to pass below the bar 7 and closer to the side of the box. The pivotal connections of the lever to the bar and to the hook are thus nearer to the box than the bar 7, whereby the strain on the link tends to securely hold the device in closed position.

What we claim is:

1. A box fastener, comprising a hook adapted to be attached to a box cover, a bar adapted to be attached to a box at its respective ends, and having its middle spaced apart from the box, a lever pivoted to the bar, and a link pivoted to the lever and adapted to engage the hook.

2. A box fastener comprising a hook made of a piece of wire folded at the middle and formed into a hook, and having diverging arms each terminating in an eye to receive a fastening, a bar bent outward at the middle and having each end terminating in an eye to receive a fastening, a lever formed of a wire having its ends pivoted on the bar and having parallel sides spaced apart and also having middle horizontal and inwardly turned portions and a handle portion formed of the folded middle part of the wire, and a wire link pivoted on the horizontal portion of the lever and adapted to engage the hook.

3. A box fastening, comprising a hook adapted to be fastened to the cover of a box, a bar adapted to be fastened to the side of a box and bent outward at the middle, a lever pivoted to the bar, and a link pivoted to the lever at one end and adapted to engage the hook at the other end, said link also being bent to afford a yielding connection and to permit the ends of the link to pass the plane of the bar.

4. In combination with a box having a cover, a wire folded at the middle, formed into a hook and bent downward opposite the edge of the cover, diverging arms to the wire each terminating in an eye and extending on the top of the cover, screws inserted in each eye and in the cover, a bar spaced apart from the side of the box and having its ends bent toward the box and each end provided with an eye, a screw in each eye and inserted in the box, a lever consisting of a wire having an eye in each end surrounding the bar, parallel portions extending from the bar and spaced apart, alined inwardly turned portions, and a handle portion formed of the folded middle portion of said wire; and a link formed of a wire having a loop in each end surrounding the inwardly turned portions of the lever, and a horizontal middle portion to engage the hook, said link also being bent to extend rearward above the bar.

5. In combination with a box having a cover, a wire hook attached to the cover and extending downward opposite the edge of the same and thence outward and upward, and also having diverging arms secured to the top of the cover, a bar secured to the box below the hook and spaced apart from the side of the box at the middle, a toggle lever consisting of a piece of wire folded at the middle to form a handle, thence extending outward horizontally near the middle and thence extending upward parallel and spaced apart and also pivoted at the respective ends on the bar, and a link having a horizontal middle portion engaging the hook and thence extending downward between the parallel portions of the lever, and pivoted at its ends to the horizontal portions of the lever.

In testimony whereof we affix our signatures in presence of two witnesses.

ALVIN T. THOITS.
JOHN G. GRONBERG.

Witnesses:
GEORGIANA CHACE,
LUTHER V. MOULTON.